April 30, 1935.　　　G. F. HOFFERBERTH　　　1,999,293
REFRIGERATING APPARATUS
Filed Oct. 28, 1931　　　3 Sheets-Sheet 2

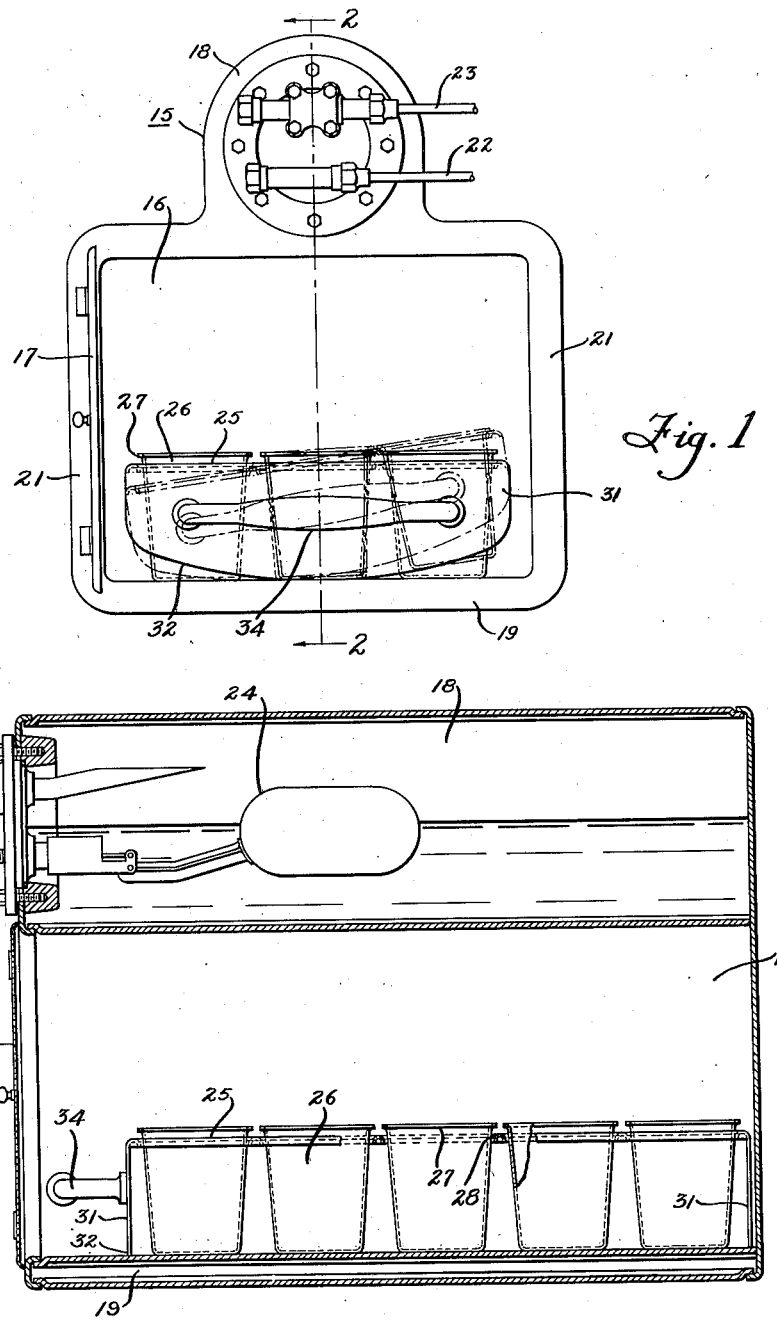

INVENTOR
George F. Hofferberth.
BY
Spencer, Hardman, and Zehe.
HIS ATTORNEYS.

April 30, 1935.  G. F. HOFFERBERTH  1,999,293
REFRIGERATING APPARATUS
Filed Oct. 28, 1931  3 Sheets-Sheet 3
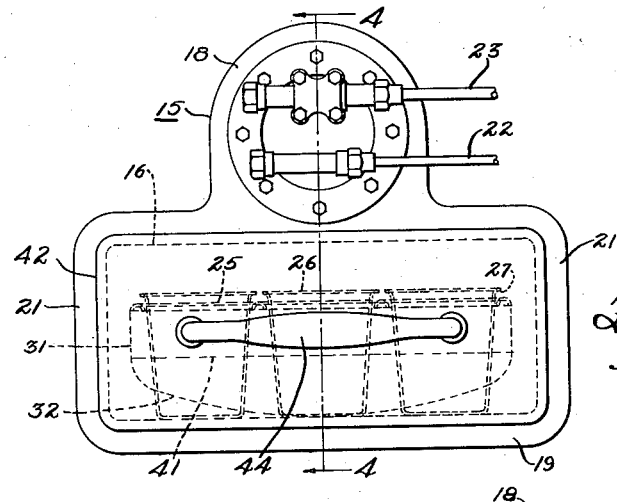
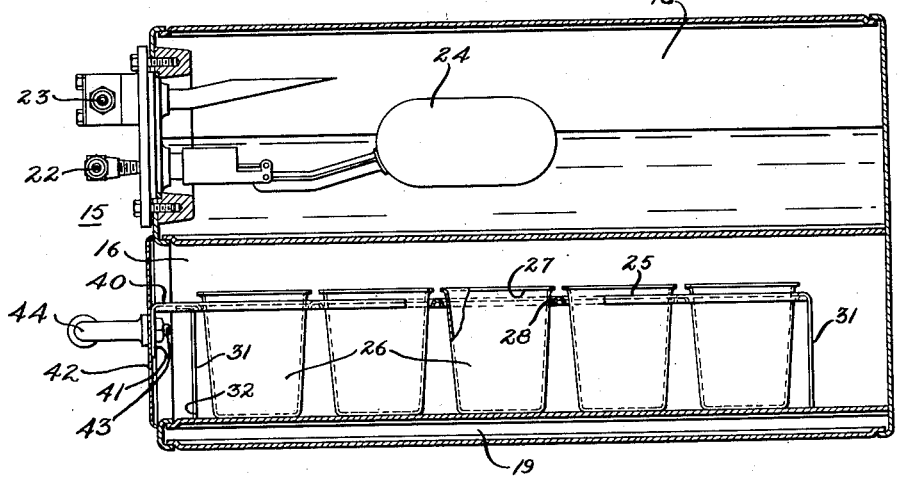
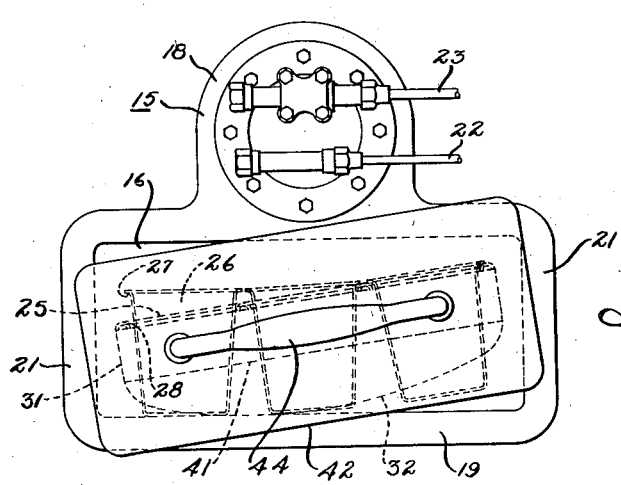
INVENTOR
George F. Hofferberth
BY
Spencer, Hardman, and Fehr.
HIS ATTORNEYS.

Patented Apr. 30, 1935

1,999,293

UNITED STATES PATENT OFFICE 1,999,293

REFRIGERATING APPARATUS

George F. Hofferberth, Dayton, Ohio, assignor, by mesne assignments, to General Motors Corporation, a corporation of Delaware Application October 28, 1931, Serial No. 571,602

12 Claims. (Cl. 62—108.5)

The present invention relates to refrigerating apparatus and particularly to mechanical refrigerating apparatus of the domestic type including an evaporator in which food and desserts are congealed or in which water is frozen.

Various forms and arrangements of ice tray structures have been heretofore used for harvesting the individual blocks or cubes of substance frozen in individual molds from evaporators of household refrigerating systems. One arrangement heretofore commonly used was a tray having a plurality of individual cups or molds detachably carried thereby. The purpose of a structure of this type was to permit the removal of as many cubes or blocks, of substance frozen in individual molds, as desired without removing all the molds from their carrying tray or rack. In a structure of this kind it has been the practice to permit the molds, containing the substance to be frozen, to remain in contact with the tray or rack employed for carrying and positioning the molds in the evaporator. Since the walls of the molds and their carrying tray or rack are usually wet, due to the spilling or splashing of some of the liquid contents of the molds therefrom during the operation of placing the tray or rack in the evaporator, it has been found to be a difficult task to remove the tray from the evaporator, and, even after the tray is removed, it is impossible for the user to remove individual molds from the tray without applying a source of heat to the molds or their carrying tray. It is well known that metal molds are more desirable for use in such devices to obtain the advantage of rapid conductivity of heat from the substance to be frozen to the evaporator of the refrigerating system and the difficulty pointed out is particularly present in such devices. To overcome this difficulty, it has been proposed to employ removable molds made of paper or vitreous material. However, it has been found that molds made of such material also stick or become frozen to their carrying tray or rack and are torn or broken in endeavoring to remove them from the rack, unless heat is applied thereto.

It is therefore obvious that devices made according to the foregoing description are impractical as far as accomplishing the desirability of removing individual molds from an evaporator of a refrigerating system and from the tray or rack employed to carry and position the molds. This impracticability is caused by permitting the molds to remain in thermal contact with their carrying tray or rack after being placed in or on an evaporator of a refrigerating system thereof.

An object of the present invention is to provide a device whereby any desired number of molds, containing the frozen substance, can be removed readily from an evaporator of a refrigerating system without removing or subjecting other molds contained in or on the evaporator to the warming influence of atmosphere exterior of the cabinet, in which the evaporator is located, or to the source of heat employed for loosening individual molds from their carrying tray or rack or to the source of heat employed for releasing frozen substances from the individually removed molds.

Another object of this invention is to provide a tray or rack for carrying and positioning a plurality of individual molds in or on an evaporator of a refrigerating system, which rack will be disengaged or moved substantially entirely out of contact with the molds during the operation of placing the molds in the evaporator or after the molds have been so placed.

In carrying out the foregoing objects, it is a further object of this invention to construct the mold carrying rack so that it can be readily moved relative to the molds to break an ice bond between the molds and the evaporator upon which they are supported.

A still further object of the present invention is to provide an ice tray with a supporting surface of a different contour than the support therefor, provided in or on a cooling element of a refrigerating system, so that the tray can be readily rocked upon its support to break an ice bond therebetween to afford easy removal of the tray from the cooling element.

Further objects and advantages of the present invention will be apparent from the following description, reference being had to the accompanying drawings, wherein a preferred form of the present invention is clearly shown.

In the drawings:

Fig. 1 discloses a front elevational view of an evaporator of a refrigerating system embodying a preferred form of the present invention;

Fig. 2 is a sectional view of the evaporator disclosed in Fig. 1 and is taken on the line 2—2 of Fig. 1;

Fig. 3 discloses a front view of a modified form of an evaporator of a refrigerating system embodying the present invention;

Fig. 4 is a sectional view of the evaporator shown in Fig. 3 and is taken on the line 4—4 of Fig. 3;

Fig. 5 is a front view of the evaporator disclosed in Figs. 3 and 4 showing the mold carrying rack in a rocked position;

Figure 6:
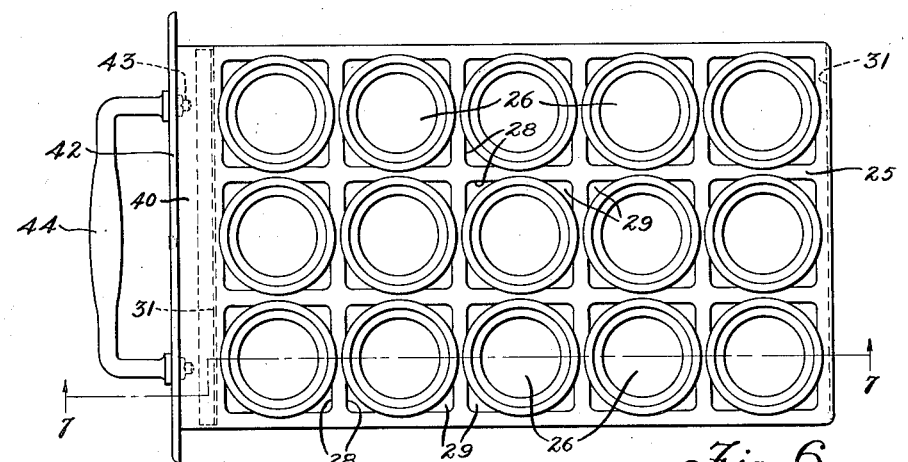
Fig. 6 is a top plan view of the tray or rack shown in Fig. 2.

Referring to the drawings and particularly to Figs. 1 and 2, for the purpose of illustrating my invention I have shown an evaporator 15 of any suitable sheet metal construction and form and preferably one that has a closed freezing compartment or chamber 16 formed therein and provided with a door 17 to permit access to the interior thereof. The door 17 is shown in open position in Fig. 1 of the drawings for the sake of clearness. The evaporator 15 includes a float chamber 18 communicating with a bottom refrigerant expansion chamber 19 and side refrigerant expansion chambers 21 which encircle the freezing compartment 16. Evaporator 15 is provided with a liquid refrigerant inlet and gaseous refrigerant outlet connections 22 and 23 respectively adapted to be connected with any suitable type of refrigerant condensing and liquefying unit (not shown). The liquid refrigerant within the evaporator 15 is maintained at a substantially constant level by a float valve mechanism 24, such, for example, as that shown in the patent to R. G. Osborn No. 1,556,708, issued October 13, 1925.

Figure 7:
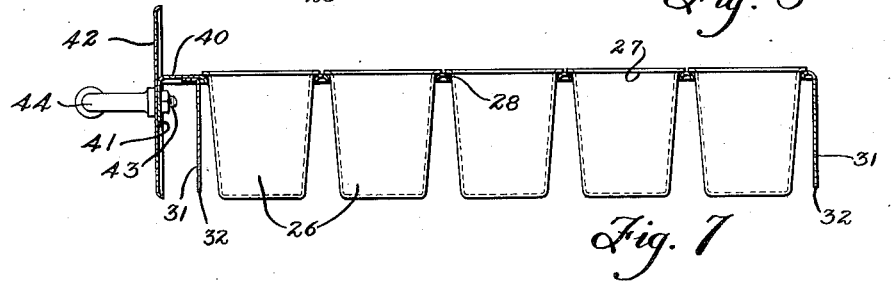
Fig. 7 is a sectional view of the rack showing the molds carried thereby and is taken on the line 7—7 of Fig. 6.
Figure 8:
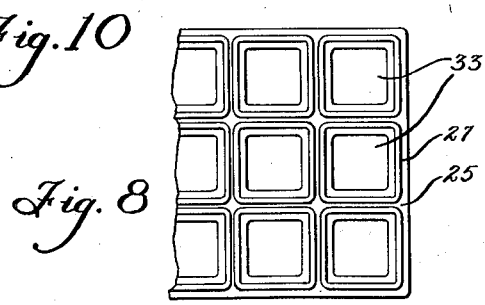
Fig. 8 is a view of the rack shown in Fig. 6 having ice molds of a different formation located therein.

The freezing compartment 16 of evaporator 15 is adapted to receive a rack 25, which rack loosely carries a plurality of removable ice molds 26 (see Fig. 7) so that the molds 26 can be uniformly positioned in the evaporator when the rack is placed therein. The molds 26 are made preferably of a thin flexible metal of high heat conductivity, preferably copper, and of uniform thickness and have their side walls tapering inwardly from the top to the bottom of the mold. The upper edges of the molds 26 are flared outwardly as at 27 so as to rest on the inner edge 28 of the openings 29 provided in the rack 25 when the molds are being carried by the rack (see Fig. 7). Rack 25 has downwardly extending supporting means such as a leg 31 at the front and at the rear thereof. These supporting legs 31 have their bottom edge curved as at 32 from the front vertical center of the rack outwardly so as to provide a rocking support for the rack 25 (see Fig. 1). Supporting legs 31 are made somewhat shorter than the overall height of the molds 26 so that when the rack 25 is supported on a horizontal support by the rack supporting means or legs 31, the molds will be moved entirely out of engagement with the rack 25 (see Figs. 2 and 4). Openings 29 in rack 25 can be of any desirable form and are preferably formed substantially square so as to receive either the round molds 26 shown in Fig. 6 or square molds 33 as shown in Fig. 8.

Since the molds 26 are loosely carried by the rack 25 and since the rack supporting means or legs 31 are shorter than the height of the molds 26, it is apparent that the rack 25 is movable relative to the molds 26 and substantially entirely out of contact therewith when positioned by the rack upon the horizontal support or the bottom wall of the freezing compartment 16 of the evaporator. Thus, the molds 26 containing the substance to be frozen are in intimate thermal contact with the evaporator 15 but are not in contact or in engagement with their carrying rack 25. Molds 26 are thereby prevented from sticking or freezing to the rack 25 should the walls of the molds or the surfaces of the rack be wet due to the presence of water or the like thereon after positioning the molds. The front leg or support 31 of the rack 25 has provided thereon a handle member 34 for moving the rack along the supporting surface of the evaporator. Since the rack is supported only by the minute portion at the rocker-like edge 32 formed on legs 31, it is apparent that the rack can readily be moved or rocked relative to the molds 26 on the supporting surface of the evaporator (see Fig. 1).

When it is desired to remove one or more individual molds containing the frozen substance from the evaporator, the operator opens the door 17 leading to the freezing compartment 16, and grasps the handle 34 and rocks the rack or tray 25 causing movement thereof relative to the molds 26 due to the molds being spaced from or out of contact with the rack. Such operation causes the inner edges 28 of the openings 29, formed in rack 25, to engage the outwardly flanged portion 27 of the molds 26 thus prying and thereby breaking the ice bond between the molds 26 and their supporting surface on the evaporator 15. The molds being loosened by such operation can then be removed by hand from the compartment 16 of the evaporator 15 without removing other molds contained in the compartment 16 and without subjecting them to the warming influence of the atmosphere outside the evaporator or outside the cabinet in which the evaporator is housed. The operator, in employing his hands for removing the molds from the evaporator, imparts the heat of his body to the exterior walls of the mold and, since the walls of the mold taper and are of very thin metal, the heat transmitted thereto by the contact of the operator's hand therewith is sufficient to release the frozen contents from the mold upon squeezing or compressing the walls thereof by hand.

Figures 9, 10:
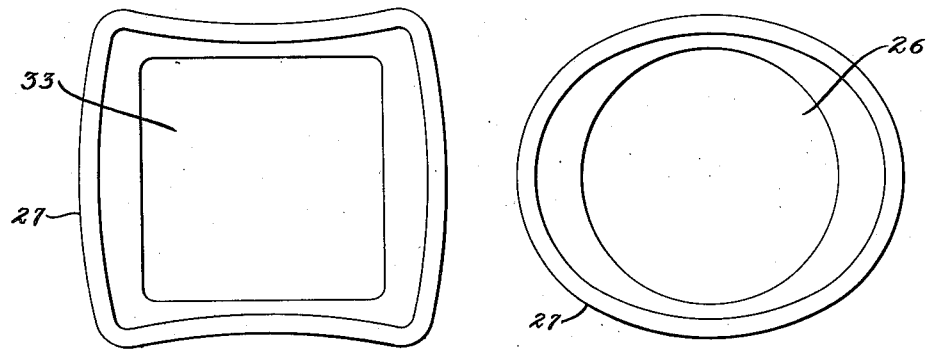
Fig. 9 is a top plan view of an ice mold of the type disclosed in Fig. 6 being deformed after causing the frozen content thereof to be removed.
Fig. 10 shows a top plan view of an ice mold of the type disclosed in Fig. 8 being deformed after causing the frozen content thereof to be removed.

In Figs. 9 and 10, I have shown the walls of molds 26 and 33 in a flexed position, which position obviously occurs just after the contents of the mold have been extracted therefrom and while still compressed by the operator. However, the walls of the molds 26 upon being released by the operator are of sufficient spring tension to return to their original form as shown in Figs. 6 and 8.

From the foregoing description of the preferred form of my invention it is apparent that I have provided an improved method of and apparatus for removing molds from an evaporator of a refrigerating system and for releasing the frozen contents from the molds. My improved method and apparatus eliminates the necessity of withdrawing all the molds contained in or on a tray or rack from the evaporator and subjecting them to the atmosphere on the exterior of the evaporator or to the atmosphere in the compartment in which the evaporator is disposed. I likewise eliminate the application of heat to any of the molds except those from which the content thereof is to be harvested. Thus, other molds containing a frozen substance and the tray employed for carrying the molds are not warmed by the removal of individual molds from the evaporator and, consequently, the temperature of the evaporator is not temporarily increased by the insertion thereinto of a warm tray after the removal therefrom of a portion of its contents as has previously occurred in the use of trays heretofore commonly employed. By the use of my improved device, the evaporator can be maintained at a more uniform low temperature and consequently the remainder of the refrigerating system is rendered more efficient in operation.

In Figs. 3, 4, and 5 of the drawings, I have shown a modified form of my invention in which elements similar in structure and function to the form of my invention heretofore described are designated by like reference characters. The freezing compartment 16 of the evaporator 15 shown in Figs. 3, 4, and 5 is not provided with a pivoted door and is not of sufficient height to permit the operator to reach thereinto while the rack or tray is positioned therein. Consequently, the tray or rack 25 in this form of the invention is provided with an extending portion 40 having a downwardly bent portion 41 providing a mounting for a front plate 42 which is secured thereto by the screws 43. The front plate 42 serves as a closure member for the open end of freezing compartment 16 when the rack 25 is positioned in the evaporator. A handle 44 provided on the front plate 42 permits the rack 25 to be moved relative to the molds 26 in the compartment 16, that is, the rack 25 can be rocked on the rocker-like edge 32 provided on the legs 31. It is to be understood that the plate 42 can be slightly spaced from the front wall of the evaporator 15 or it may be suitably insulated therefrom to prevent freezing or sticking to the evaporator. It is apparent therefore that in this form of my invention the operator merely grasps the handle 44 and rotates the front plate 42 into the position shown in Fig. 5. Rotation of the plate 42 causes rocking of the rack 25 to break the ice bond between the molds 26 and the supporting surface on the evaporator 15. After the molds are loosened from the evaporator, the rack 25 and consequently the molds 26 carried thereby, can be moved outwardly of the compartment 16 and any desired number of molds 26 can be taken from the rack 25. The frozen substance contained in the molds removed from the rack can then be extracted therefrom in the same manner as heretofore described.

It is therefore apparent from the foregoing description that my improved devices eliminates the difficulties heretofore enumerated with respect to ice trays and their molds employed in the prior art.

My improved devices also provide a new combination in that, by making the supporting surface of the tray curved or of a different contour than the support therefor provided on the cooling element, the tray is readily and easily rockable on its support to break an ice bond between the supporting surface of the tray and the support on the cooling element. This feature of the invention reduces manufacturing expense in that it eliminates the cost of providing tray releasing devices or mechanisms commonly employed in present-day refrigerators for releasing an ice tray from its support.

While the forms of the invention as herein disclosed constitute preferred forms, it is to be understood that other forms might also be adopted, all coming within the scope of the claims which follow.

What is claimed is as follows:

1. A refrigerating apparatus comprising in combination, an evaporator, a support on said evaporator, a plurality of molds on said support, means for carrying and uniformly positioning said molds on said support, said means including means for supporting same on said support out of engagement with said molds, said last named means being rockable on said support to break an ice bond between said molds and said support.

2. A refrigerating apparatus comprising in combination, an evaporator, a support on said evaporator, a plurality of molds on said support, a rack for carrying and uniformly positioning said molds on said support, legs on said rack for supporting same on said support out of engagement with said molds, said legs being rockable on said support to break an ice bond between said molds and said support.

3. In refrigerating apparatus, a plurality of molds to be cooled, a support for the molds, a rack for moving the molds along the surface of the support, said rack having means for supporting same on said support out of engagement with said molds, said means being integral with said rack and rockable with respect to said support for breaking an ice bond between the molds and said support.

4. A refrigerating apparatus comprising in combination, an evaporator provided with a freezing compartment, a plurality of molds within said compartment, means for moving the molds along the supporting surface of said compartment, means integral with said first named means for supporting said first named means out of engagement with said molds, said second named means being rockable on the supporting surface of said compartment, and handle means on the exterior of said compartment for rocking said second named means.

5. A refrigerating apparatus comprising in combination, an evaporator provided with a freezing compartment, a plurality of molds within said compartment, means for moving the molds along the supporting surface of said compartment, means integral with said first named means for supporting said first named means out of engagement with said molds, said second named means being rockable on the supporting surface of said compartment, and means for closing said freezing compartment, said last named means being provided with a handle for rocking said second named means.

6. A refrigerating apparatus comprising in combination, an evaporator provided with a freezing compartment, a plurality of molds within said compartment, means for moving the molds along the supporting surface of said compartment, means integral with said first named means for supporting said first named means out of engagement with said molds, said second named means being rockable on the supporting surface of said compartment, and handle means integral with said second named means for rocking said second named means on the supporting surface of said compartment.

7. A refrigerating apparatus comprising in combination, a cooling unit, a support on said cooling unit, a device supported on said support and having means adapted to contain a substance to be congealed or frozen, means in addition to the supporting surface of said device for normally maintaining the means adapted to contain the substance to be congealed or frozen in direct heat transfer relation with the cooling unit, and a portion of the supporting surface of said device being of a different contour than the surface of said support and being rockable thereon to break an ice bond therebetween.

8. A refrigerating apparatus comprising in combination, a cooling unit, a flat support on said cooling unit, a device supported on said flat support and having means adapted to contain a substance to be congealed or frozen, means in addition to the supporting surface of said device for normally maintaining the means adapted to contain the substance to be congealed or frozen in direct heat transfer relation with the cooling unit, and a portion of the supporting surface of said device being arcuate in form and being rockable on said flat support to break an ice bond therebetween.

9. A refrigerating apparatus comprising in combination, a cooling unit provided with a sharp freezing compartment, a support within said compartment, a device supported on said support and having means adapted to contain a substance to be congealed or frozen, means in addition to the supporting surface of said device for normally maintaining the means adapted to contain the substance to be congealed or frozen in direct heat transfer relation with the cooling unit, and a portion of the supporting surface of said device being of a different contour than the surface of said support and being rockable thereon to break an ice bond therebetween.

10. A refrigerating apparatus comprising in combination, a cooling unit provided with a sharp freezing compartment, a flat support within said compartment, a device supported on said flat support and having means adapted to contain a substance to be congealed or frozen, means in addition to the supporting surface of said device for normally maintaining the means adapted to contain the substance to be congealed or frozen in direct heat transfer relation with the cooling unit, and a portion of the supporting surface of said device being arcuate in form and being rockable on said flat support to break an ice bond therebetween.

11. A refrigerating apparatus comprising in combination, a cooling unit, a support on said cooling unit, a device supported on said support and having a plurality of cups for containing a substance to be congealed or frozen loosely carried thereby and adapted to engage said support when the device is supported thereon, and the supporting surface of said device being of a different contour than the surface of said support and being rockable thereon to break an ice bond between the cups and the supporting surface.

12. A freezing tray comprising a frame having a plurality of openings therein, a support for retaining the frame above the surface on which it is placed, a plurality of separate cups loosely arranged in the openings in said frame, each of the cups having portions arranged to engage the frame to support said cups therein when raised from the surface, the vertical distance between the lower surfaces of the portions and the bottoms of the cups being substantially greater than the vertical distance between the top of the frame and the bottom of the support, and the supporting surface of the support of said frame being of a different contour than the surface on which it is placed and being rockable thereon to break an ice bond between the cups and the surface upon which the frame is supported.

GEORGE F. HOFFERBERTH.